United States Patent
Schropp, Jr.

(10) Patent No.: US 10,572,065 B2
(45) Date of Patent: Feb. 25, 2020

(54) AUTOMOTIVE ACCELERATION COMPENSATION FORCE SENSING

(71) Applicant: Synaptics Incorporated, San Jose, CA (US)

(72) Inventor: Donald R. Schropp, Jr., Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/892,174

(22) Filed: Feb. 8, 2018

(65) Prior Publication Data
US 2019/0243508 A1    Aug. 8, 2019

(51) Int. Cl.
| G06F 3/041 | (2006.01) |
| G06F 3/044 | (2006.01) |
| G01L 1/26 | (2006.01) |
| G01P 15/18 | (2013.01) |

(52) U.S. Cl.
CPC .............. *G06F 3/0418* (2013.01); *G01L 1/26* (2013.01); *G01P 15/18* (2013.01); *G06F 3/044* (2013.01); *G06F 2203/04105* (2013.01)

(58) Field of Classification Search
CPC .................. G06F 3/0418; G06F 3/044; G06F 2203/04105; G01P 15/18; G01L 1/26
See application file for complete search history.

(56) References Cited

U.S. PATENT DOCUMENTS

| 6,411,828 B1* | 6/2002 | Lands ................... H04M 1/605 379/388.01 |
| 7,292,925 B1* | 11/2007 | Watanabe ............. B60T 8/1706 701/70 |
| 2005/0154798 A1* | 7/2005 | Nurmi ................... G06F 1/1626 710/1 |
| 2006/0142920 A1* | 6/2006 | Hashiba .................. B60T 8/368 701/70 |
| 2009/0100384 A1* | 4/2009 | Louch ................... G06F 1/1626 715/863 |
| 2011/0012869 A1* | 1/2011 | Klinghult .............. G06F 1/3203 345/178 |
| 2012/0256874 A1* | 10/2012 | Jiyama .................. G06F 3/0414 345/174 |
| 2012/0262396 A1* | 10/2012 | Jiyama .................. G06F 3/0414 345/173 |
| 2014/0247239 A1* | 9/2014 | Jamshidi-Roudbari ..................... G06F 3/0414 345/174 |

* cited by examiner

*Primary Examiner* — Mihir K Rayan
(74) *Attorney, Agent, or Firm* — Ferguson Braswell Fraser Kubasta PC

(57) ABSTRACT

Automotive acceleration compensation force sensing includes determining a total force value from the measurements from force sensors, obtaining, from an accelerometer, an environmental acceleration value, and calculating an input object force value on an input surface using a total force value and the environmental acceleration value. Automotive acceleration compensation force sensing further includes reporting the input object force value.

20 Claims, 8 Drawing Sheets

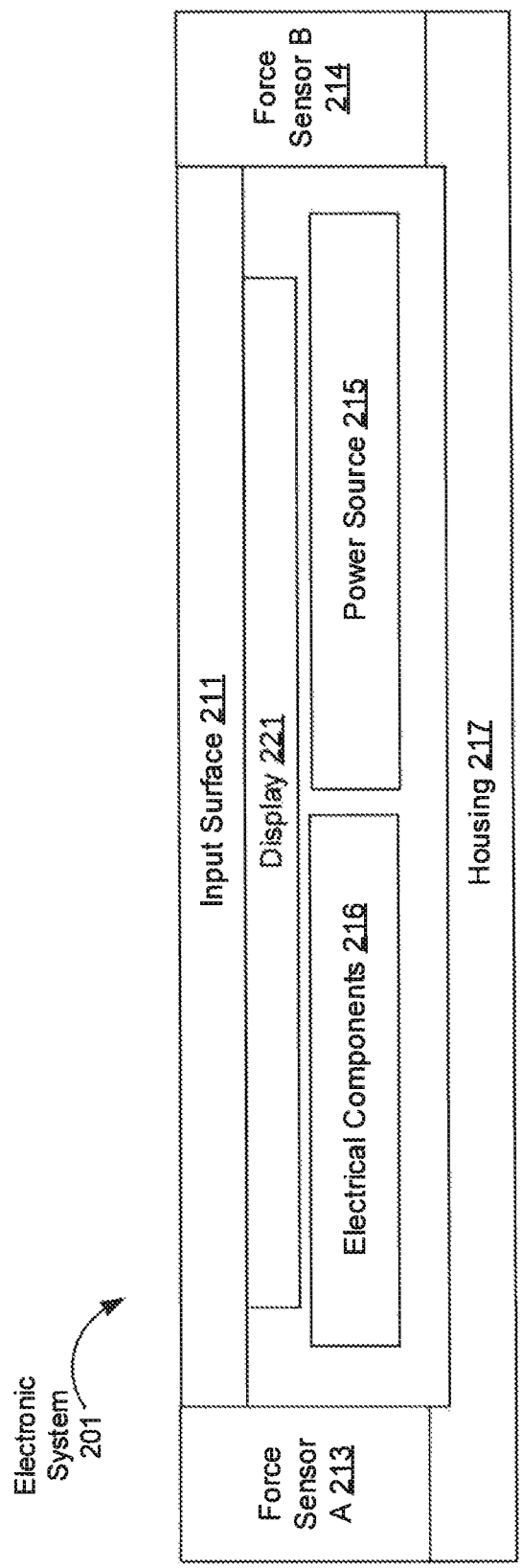
FIG. 2.1

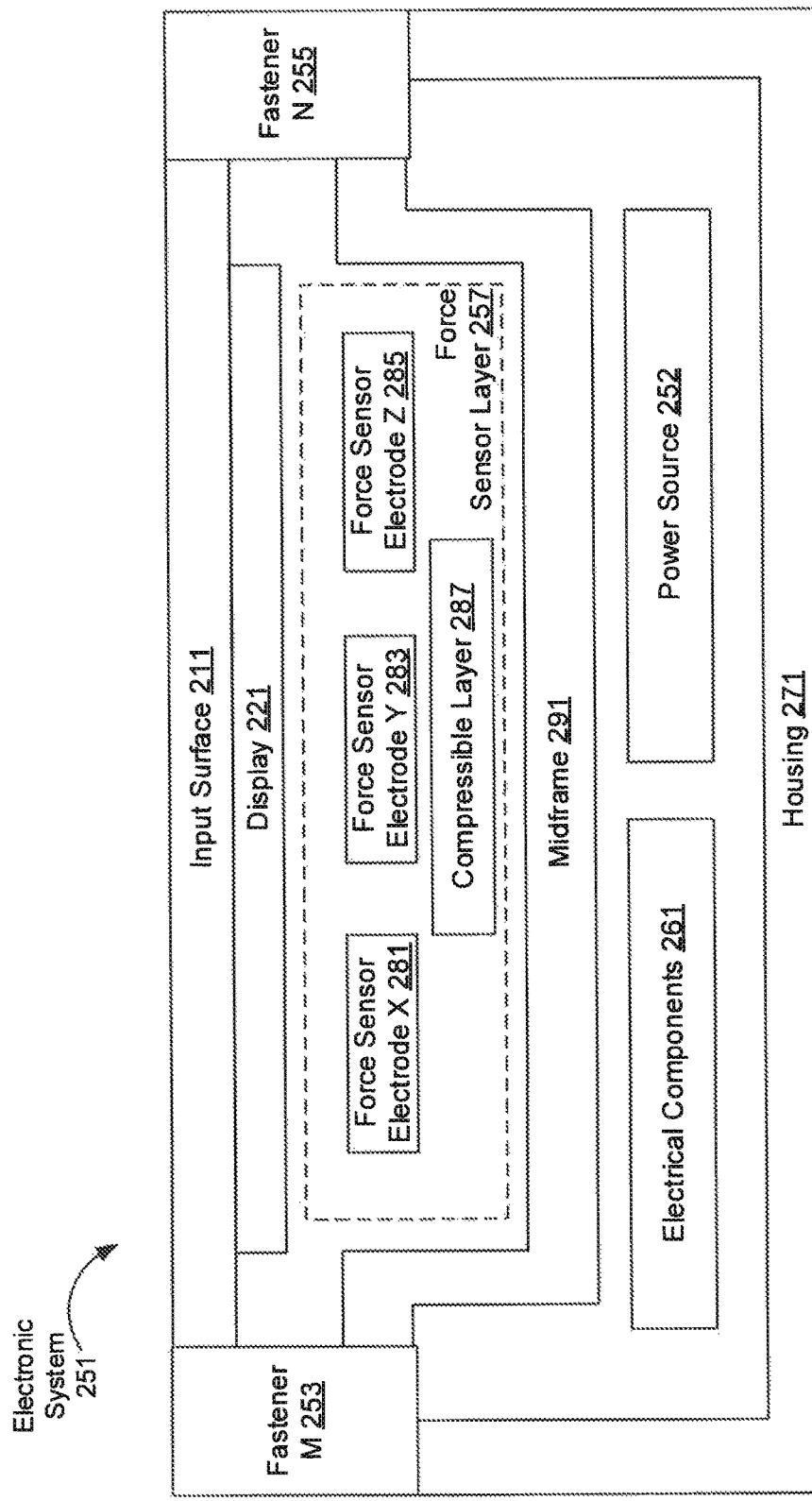
FIG. 2.2

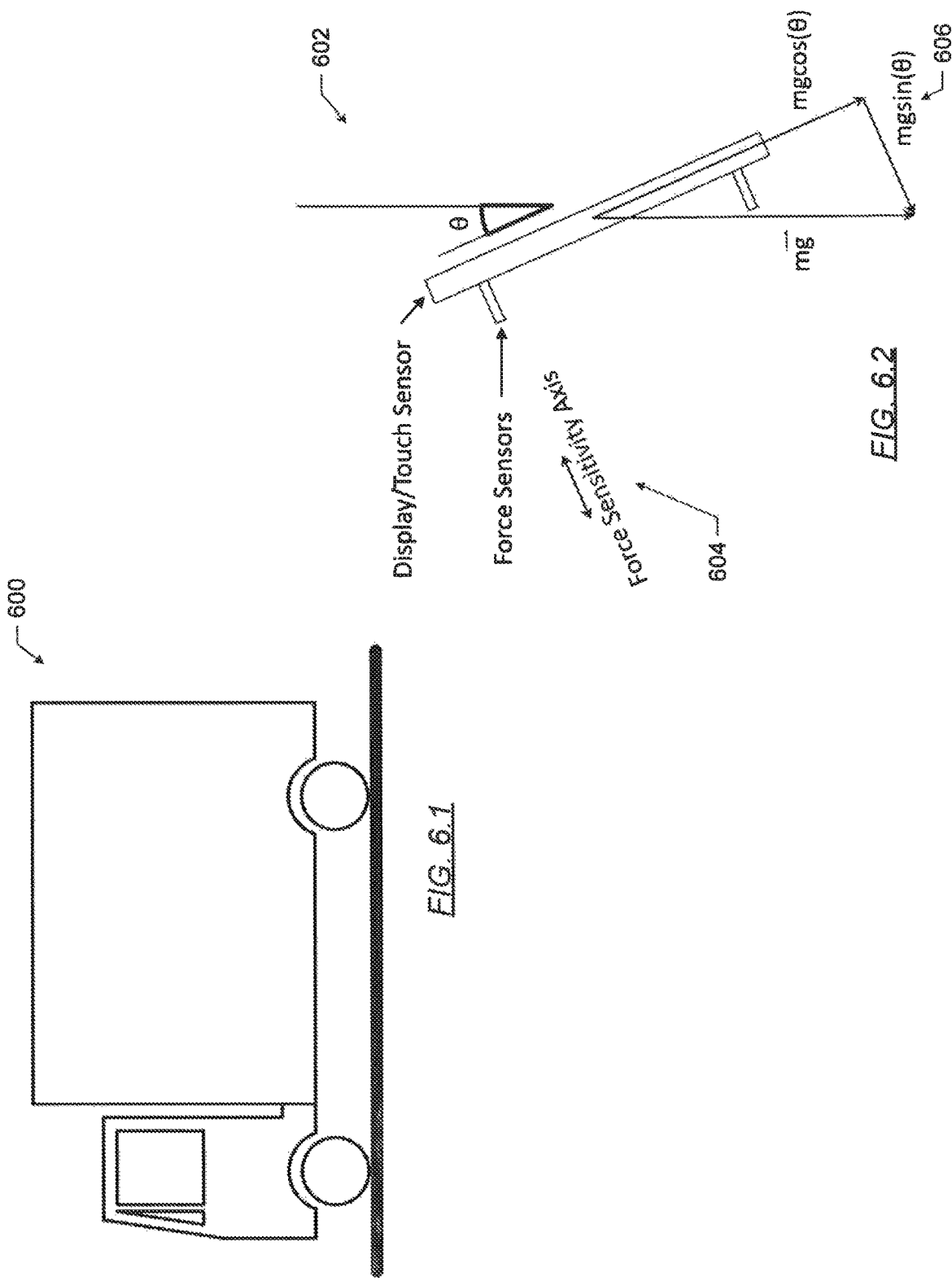

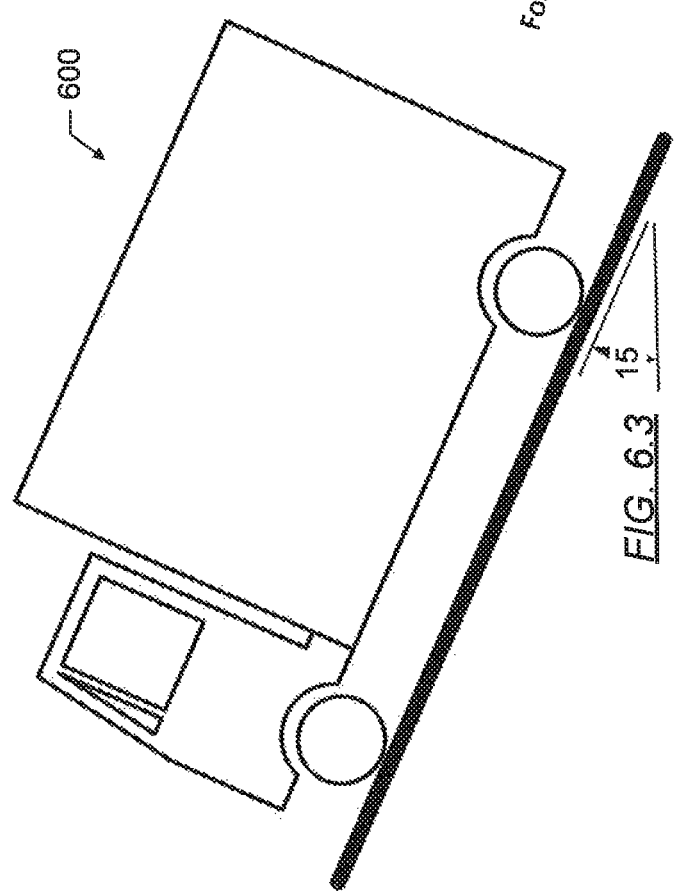
FIG. 6.3
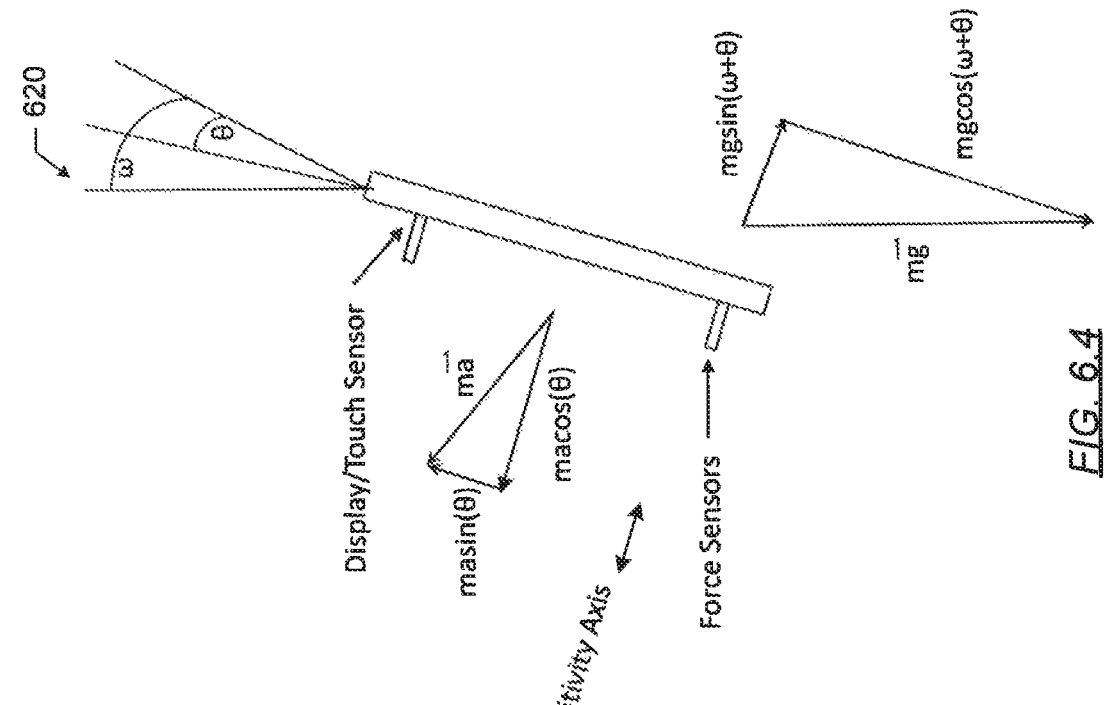
FIG. 6.4

AUTOMOTIVE ACCELERATION COMPENSATION FORCE SENSING

FIELD

This invention generally relates to electronic devices, and more specifically, to improving force sensing in the electronic devices.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices are used in a variety of settings. One use of proximity sensor devices is in automobiles (e.g., cars, vans, trucks, etc.). In particular, automobile proximity sensor devices are integrated into the automobile. Such proximity sensor devices may be used for climate control, managing the car radio and entertainment systems, performing navigation, operating or connecting to the control systems of the automobile, and performing other operations.

SUMMARY

Some example embodiments are directed to a processing system for automotive acceleration compensation force sensing. The processing system includes sensor circuitry configured to obtain measurements from force sensors, and processing circuitry coupled to the sensor circuitry. The processing circuitry is configured to determine a total force value from the measurements, obtain, from an accelerometer, an environmental acceleration value, and calculate an input object force value on an input surface using a total force value and the environmental acceleration value. The processing circuitry is further configured to report the input object force value.

Some example embodiments are directed to a method for automotive acceleration compensation force sensing. The method includes determining a total force value from measurements, obtaining, from an accelerometer, an environmental acceleration value, calculating an input object force value on an input surface using a total force value and the environmental acceleration value, and reporting the input object force value.

Some example embodiments are directed to a system for automotive acceleration compensation force sensing, the system includes an accelerometer configured to measure an environmental acceleration value, force sensors, and processing circuitry. The processing circuitry is communicatively coupled to the force sensors and the accelerometer. The processing circuitry is configured to determine a total force value from measurements obtained from the force sensors, obtain, from an accelerometer, the environmental acceleration value, calculate an input object force value on an input surface using a total force value and the environmental acceleration value, and report the input object force value.

Other aspects of the invention will be apparent from the following description and the appended claims.

BRIEF DESCRIPTION OF DRAWINGS

FIGS. 2.1 and 2.2 show diagrams of input devices having force sensing in accordance with one or more embodiments of the invention.

FIGS. 6.1, 6.2, 6.3, and 6.4 show an example in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments described herein provide input devices and methods that facilitate improved usability. In particular, one or more embodiments are directed to automotive acceleration compensation force sensing. The automotive acceleration compensation force sensing compensates for forces affecting an input device when performing force sensing in an automobile. To compensate for force, an accelerometer is incorporated into the automobile. The measurements from the accelerometer are indicative of the forces of the automobile accelerating. By incorporating an accelerometer and using the measurements from the accelerometer when deter mining the amount of force applied to the input surface, one or more embodiments provide for more accurate force detection.

Figure 1:
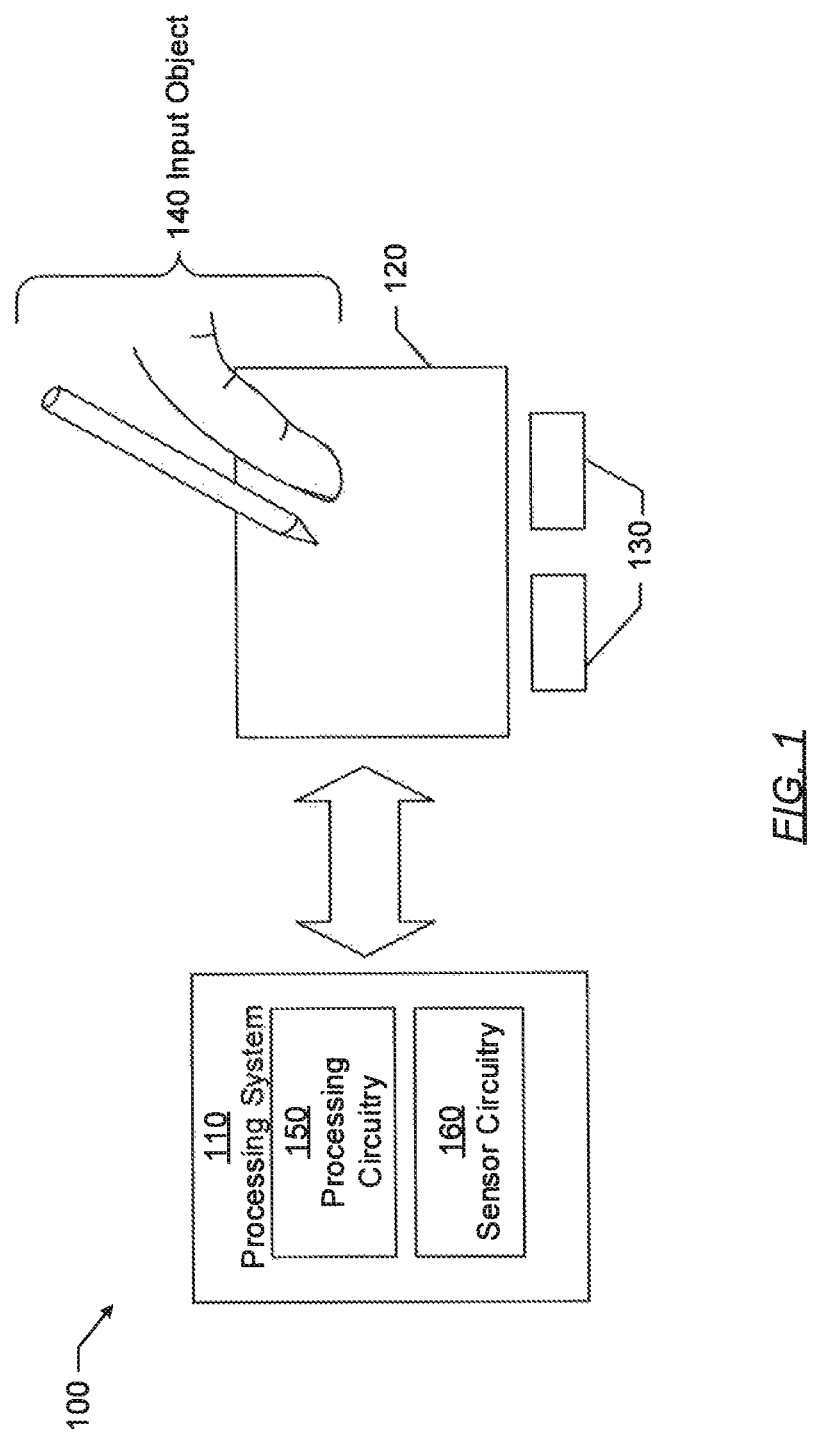
FIG. 1 shows a diagram of an input device in accordance with one or more embodiments of the invention.

FIG. 1 shows a block diagram of an exemplary input device (100), in accordance with various embodiments. The input device (100) may be configured to provide input to an electronic system (not shown). As used in this document, the term "electronic system" (or "electronic device") broadly refers to any system capable of electronically processing information that is integrated into an automobile. In particular, the electronic system may be a control computing device of the automobile. Examples of electronic systems include in dash device, an automobile control system, an entertainment system, an infotainment system, or other device. The input device (100) may be implemented as a physical part of the electronic system, or may be physically separate from the electronic system. Further, portions of the input device (100) may be part of the electronic system. For example, all or part of the determination module may be implemented in a device driver that executes on processing circuitry of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (such as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. An image is a collection of measurements of the sensing region (120) where each measurement corresponds to a particular position on the sensing region (120). For example, in capacitive implementation, a capacitive image has a capacitive measurement for each location of the sensing region (120). Some implementations are configured to use and/or provide projections of input along particular axes or planes. A projection is an aggregation of measurements along the axis or plane. For example, a projection may have multiple values, where each value is along a first axis, and each value is a sum of the measurements along a second axis. By way of a more specific example, a column projection may have a single value for each row of a column, where each single value corresponds to a sum of the measurement values for the row. Further, some implementations may be configured to use and/or provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object (140). Self-capacitance sensing measures the self-capacitance of the sensor electrode, where the self-capacitance is the amount of electric charge that must be added to a sensor electrode to raise the sensor electrode's electric potential by one unit (e.g., one volt). The self-capacitance of the sensor electrode changes when an input object (140) is proximate to the sensor electrode. In other words, an input object (140) near the sensor electrodes alters the electric field near the sensor electrodes, thus changing the measured capacitive coupling. In one implementation, an absolute capacitance sensing method operates by modulating signals on sensor electrodes with respect to a reference voltage (e.g., system ground), and by detecting the capacitive coupling between the sensor electrodes and input objects (140). The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object (140) near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. The signals sent on the transmitter electrodes are modulated relative to the signals on the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system (110) for a mutual capacitance sensor device may include transmitter circuitry configured to transmit signals with transmitter sensor electrodes, and/or receiver circuitry configured to receive signals with receiver sensor electrodes. Further, a processing system (110) for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include processing circuitry (150) and sensor circuitry (160). The processing circuitry (150) may include functionality to determine when at least one input object (140) is in a sensing region (120), and determine force applied by the input object (140), determine positional information of the input object (140) and/or perform other operations.

The sensor circuitry (160) may include functionality to drive the sensing elements to transmit transmitter signals and receive the resulting signals. For example, the sensor circuitry (160) may include sensory circuitry that is coupled to the sensing elements. The sensor circuitry (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region (120) when an input object (140) is not present. For example, a capacitive baseline is an estimate of the background capacitance of the sensing region (120). Each sensing element may have a corresponding individual value in the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (©LED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system (110), the input device (100), and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

As discussed above, embodiments of the disclosure are directed to force sensing in an automobile. FIG. 2.1 shows an example cross sectional diagram of an electronic system (201) that performs force sensing in an automobile in accordance with one or more embodiments. As shown in FIG. 2.1, an electronic system (201) may include an input surface (211), display (221), force sensors (e.g., force sensor A (213), force sensor B (214)), power source (215), electrical components (216), and housing (217). Each of these components is described below.

The housing (217) may be metal, plastic, other material, or a combination of materials. The housing (217) may be referred to as the frame of the electronic system (201) and may hold the input device.

The input device may include the input surface (211), and display (221), as well as various components described above with reference to FIG. 1. The input surface (211) is the surface of the input device that may be touched by an input object. For example, the input surface (211) may be glass or other material. The display (221) is a physical device that is configured to present visual information to a user. For example, the display (221) may be any type of light emitting diode (LED), organic LED (OLED), liquid crystal display (LCD), plasma, electroluminescence (EL), or other display technology. Although FIG. 2.1 shows a distinct input surface (211) and display (221), the input surface (211) may be an uppermost part of the display (221). Further, although FIG. 2.1 shows an electronic system (201) with an input surface (211) adjacent to the display (221), the electronic system (201) may have an input device that is separate from the display. For example, the input device may be a touchpad with integrated force sensing (e.g., a force pad) having the input surface (211), force sensor electrodes, and compressible layer, which are separate from the display (221) and the remainder of the electronic system.

Force sensors (e.g., force sensor A (213), force sensor B (214)) connect the input surface (211) to the housing (217). The force sensors (e.g., force sensor A (213), force sensor B (214)) are configured to provide an electrical signal based on an amount of force on the input surface (211). For example, the force sensors (e.g., force sensor A (213), force sensor B (214)) may be strain gauge load cell.

The electronic system (201) may further include various electrical components (216) and a power source (215). The electrical components (216) may include one or more circuit boards, such as a main board or printed circuit board assembly, that have various integrated circuits attached to the circuit boards. In another example, the electrical components (216) may include a processor, memory, and/or any other electrical devices for operating the electronic system (201).

Furthermore, the power source (215) may be hardware that includes functionality to provide electrical power to the electrical components (216), the force sensors (e.g., force sensor A (213), force sensor B (214)), and a processing system (not shown). For example, the power source (215) may be a rechargeable battery with functionality to charge using an electric current obtained from an external power source connected to the electronic system (201).

FIG. 2.1 shows one configuration or an electronic system (201) for performing force sensing in accordance with one or more embodiments of the invention. Other configurations may also exist. FIG. 2.2 show an example cross sectional diagram of an electronic system (251) that performs force sensing in an automobile in accordance with one or more embodiments. As shown in FIG. 2.2, an electronic system (251) may include an input surface (211), display (221), a force sensor layer (257), midframe (291), power source (252), electrical components (261), and housing (271). Each of these components is described below. The input surface (211), display (221), power source (252), electrical components (261), and housing (271) may be the same or similar to the like named components in FIG. 2.1.

The input surface (211) and display (221) in FIG. 2.2 may have bending properties that define the amount of bending by the input surface (211) and display (221) in response to force at various positions along the input surface (211). In other words, the bending properties of the input surface (211) and display (221) refer to the amount of bend (i.e., deflection) of the input surface (211) and display (221) when subjected to an external force onto the input surface (211) and display (221). The input surface (211) and display (221) may be treated as having single bending properties or individual bending properties.

One or more fasteners (e.g., fastener M (253), fastener N (255)) may connect the input surface (211) and the display (221) to the housing (271) at attachment points. The fasteners (e.g., fastener M (253), fastener N (255)) may hold the display structure to the midframe (291). The display structure includes the input surface (e.g., cover glass or other material) which is attached to the display (221) by a layer of optically clear adhesive. The fastener (e.g., fastener M (253), fastener N (255)) may be an adhesive (e.g., weld, solder, cement, glue), crimping, a mounting bracket or other hardware connector, or other type of fastener. The attachment points are the points at which the fastener (e.g., fastener M (253), fastener N (255)) connects the input surface (211) and display (221) to the housing (271). For example, the attachment points may be around the edges of the display structure.

In one or more embodiments, the electronic system (251) includes a mid frame (291) disposed between the display (221) and the housing (271). For example, the midframe (291) may be a conductive material configured as an interior support frame, for example, for the electronic system (251). Moreover, the midframe (291) may be a piece of sheet metal, such as a shielding can. In one or more embodiments, the midframe (291) is a foil or plating layer attached to a non-conductive substrate. The midframe (291) may include various punch outs or cutouts for electrical and/or optical connectors that may affect the bending properties.

The force sensor layer (257) is a layer of force sensors. The force sensors may be an arrangement of a compressible layer (287) and force sensor electrodes (e.g., force sensor electrode X (281), force sensor electrode Y (283), force sensor electrode Z (285)). The compressible layer (287) may include air, a compressible material such as foam, springs (e.g., coil, leaf, bendable bar) or a combination of air and compressible materials.

The force sensor electrodes (e.g., force sensor electrode X (281), force sensor electrode Y (283), force sensor electrode Z (285)) are sensor electrodes that are arranged so as to be electrically affected by a force applied to the input surface. Thus, measurements acquired using the force sensor electrodes indicate the amount of force applied to the input surface. Various arrangements of force sensor electrodes may be used. The following are a few example arrangements.

In particular, FIG. 2.2 shows an example in which the force sensor electrodes are attached to or as a part of the display. In such a scenario, absolute capacitive sensing may be used. In particular, when force is applied to the input surface (211), the compressible layer (287) compresses, causing the midframe (291) to be closer to the force sensor electrodes (e.g., force sensor electrode X (281), force sensor electrode Y (283), force sensor electrode Z (285)). Based on the decrease in distance between the force sensor electrodes and the midframe (i.e., the amount of bend or deflection), the absolute capacitance of a force sensor electrode changes. The amount of change reflects the amount of the decrease and, correspondingly, the amount of force applied.

In another embodiment of the configuration of FIG. 2.2, transcapacitive sensing may be used. In such a scenario, a first subset of the force sensor electrodes adjacent to the display may be transmitter electrodes and a second subset of force sensor electrodes adjacent to the display may be receiver electrodes. By way of an example only, the first subset may be force sensor electrode Y (283) and the second subset may be force sensor electrode X (281) and force sensor electrode Z (285). The transmitter electrodes may transmit transmission signals and the receiver electrodes may receive resulting signals from the transmission signals. When a force is applied to the input surface (211), the compressible layer (287) compresses causing the midframe (291) to be closer to the transmitter electrodes and receiver electrodes. The reduction of distance to the midframe (291) changes the resulting signals received by the receiver electrodes as compared to the electronic system (251) without force applied. Thus, the measurements of the resulting signals are affected by the amount of force applied.

By way of another configuration (not shown), a first subset of the force sensor electrodes may be located above the compressible layer and a second subset of the force sensor electrodes may be located below the compressible layer. Further, the midframe (291) may or may not include conductive material. In the example, transcapacitive sensing between the first subset and second subset may be performed as described above to determine the amount of deflection of the first subset toward the second subset. The amount of deflection is indicative of the amount of force on the input surface (211).

In another example (not shown) electrodes of the display (221) may be used for both display updating and force and/or touch sensing. In other words, some of the electrodes used to update the display (221) may be used to perform capacitive sensing. The capacitive sensing may be for force (e.g., based on capacitance being affected by an amount of compression of the compressible layer) and/or for touch (e.g, based on capacitance being affected by a position of an input object in the sensing region) to determine positional information.

The above are only a few examples. Other configurations of the electronic system to perform force sensing may he used. For example, such other configurations may use elastive, inductive, or resistive techniques for performing force sensing.

Figure 3:
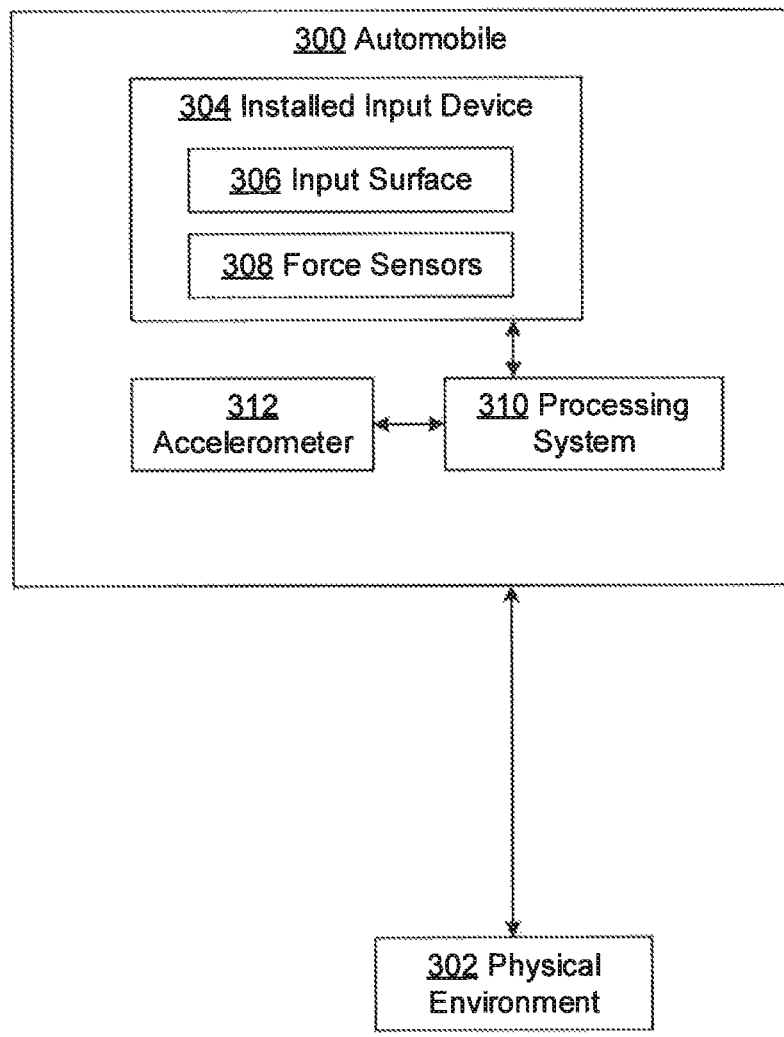
FIG. 3 shows a diagram of an automobile with an input device for force sensing in accordance with one or more embodiments of the invention.

Embodiments perform force sensing in an automobile. FIG. 3 shows an example diagram of a system in accordance with one or more embodiments of the invention. As shown in FIG. 3, an automobile (300) is connected to a physical environment (302). An automobile (300) is a powered vehicle that moves on a road and may carry one or more humans, pets, cargo, or other objects. For example, an automobile may be powered by an electrical and/or combustive motor. Example automobiles include sedans, minivans, vans, recreational vehicles, sport utility vehicles, trucks, and other vehicles.

The automobile (300) operates in a physical environment (302). The physical environment (302) of the automobile (300) includes the physical geography of the terrain on which the automobile is moving. For example, the physical environment (302) may include an angle of the road, bumps in the road, turns and other changes in direction of the road, potholes in the road, grating, and other road conditions. The physical environment (302) changes over time as the automobile (300) moves. Changes in the physical environment (302) may have an acceleration component. The acceleration component may be in relation to gravity, movement in a particular direction (e.g., pothole, bump) or other change. Further, the motor (not shown) of the automobile (300) may also accelerate in the physical environment (302). Acceleration may include centripetal acceleration. The changes of the physical environment (302) may also include changes in angle of the automobile (300), which changes the amount that environmental force and force through acceleration of the automobile (300) affects the measured force on the input device.

Continuing with the automobile (300), the automobile (300) includes an installed input device (304) having an input surface (306) and force sensors (308). The automobile (300) further includes a processing system (310) and an accelerometer (312). The input device (304) is installed in the automobile (300). In other words, the input device (304) may be affixed or otherwise attached to the automobile (300). The input device (304) may be permanently or semi-permanently attached (e.g., through various fasteners) to the automobile (300). In some embodiments, the input device (304) is temporarily attached to the automobile (300) (e.g., using a cradle or mount for the input device (304) or electronic system). In some embodiments, the angle of the input device (304) with respect to the automobile (300) is fixed. In such embodiments, the input device (304) does not change angular position with respect to a spatial plane of the automobile (300).

The input surface (306) is the surface that may be touched by an input object. In particular, an individual (e.g., human) holding the input object may apply a force to the input surface (306). The input surface (306) corresponds to the physical input surface discussed above with reference to FIGS. 1 and 2. The force sensors (308) are hardware that includes functionality to indirectly measure force affecting the input surface (306). For example, the force sensors (308) may correspond to the force sensor electrodes discussed above with reference to FIG. 2. In the capacitive example of FIG. 2, the force sensor electrodes include functionality to measure the change in capacitance on the input surface (306) as affected by force. Thus, the force sensors indirectly measure the force. In one or more embodiments, the force indirectly measured by the force sensors (308) include a combination of force applied by the input objects as well as environmental forces (e.g., forces due to gravity and acceleration of the automobile) (300).

The accelerometer (312) is a physical device that measures acceleration. The acceleration measured by the accelerometer (312) is an environmental acceleration value. The accelerometer (312) may further include functionality to directly provide the direction of the acceleration. For example, the accelerometer (312) may be a single axis, two-axis accelerometer, or a three-axis accelerometer. If a single axis accelerometer is used, the single axis accelerometer provides an acceleration measurement along a particular axis. Thus, a single axis-accelerometer is placed at a position such that the particular axis is normal to the spatial plane of the input surface (306). In other words, the single axis accelerometer is placed to provide the acceleration in the same direction as the force of the input object. A similar placement as for the single axis accelerometer may be performed for a two axis accelerometer. A three-axis accelerometer may be placed in any orientation and may provide an environmental acceleration value along each axis being measured. When combined, the environmental acceleration value along each axis being measured provides the direction of the environmental acceleration.

The accelerometer (312) is placed in a fixed orientation relative to the input surface (306). For example, if the input surface (306) is located at a fixed angle and location in the automobile (300), the accelerometer (312) is also set at a fixed angle and location in the automobile (300). The location and angle of the accelerometer (312) may not be the same as the location and the angle of the input surface (306). For example, the input device with the input surface (306) may be located in the dashboard of the automobile (300), which the accelerometer (312) is located in a separate control system, on a bumper, or in virtually any other position in or on the automobile (300). By way of another example, if the input surface (306) is not located at a fixed angle and location in the automobile (300), the accelerometer (312) is set to be at the same variable angle and location as the input surface (306) at the same time as the input surface (306). For example, the accelerometer (312) may be in the installed input device (304), such as near the midplane or in the housing of the input device as discussed above with reference to FIG. 2.

The processing system (310) is directly or indirectly communicatively coupled to the force sensors (308) of the installed input device (304) and the accelerometer (312). The processing system (310) includes functionality to obtain measurements from the accelerometer (312) and the force sensors (308). The processing system (310) further includes functionality to determine a force on the input surface (306) by an input object based on the measurements. The processing system (310) may be the same or similar to the processing system discussed above with reference to FIG. 1.

When an automobile (300) is moving, various environmental forces may act on the input surface (306). Without accounting for the various environmental forces, the calculated force of an input object applied to the input surface (306) may be incorrect. One or more embodiments account for the various environmental forces using the measurements from the accelerometer (312) to obtain a more accurate measurement of the force applied by the input object.

Figure 4:
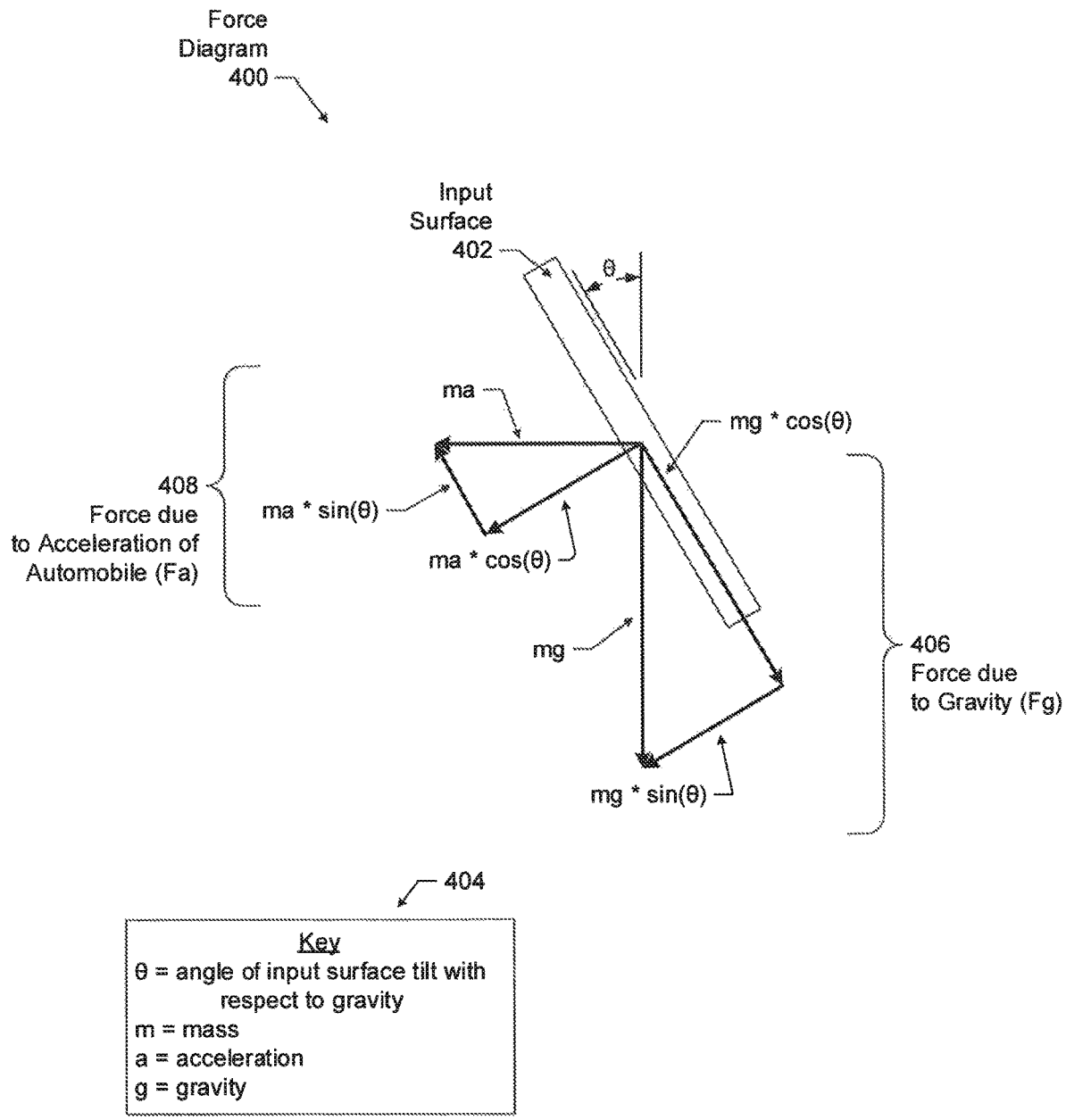
FIG. 4 shows a force diagram illustrating forces on an input device in accordance with one or more embodiments of the invention.

FIG. 4 is a force diagram (400) showing the various environmental forces on an input surface (402). FIG. 4 also includes a key (404) that provides the meaning of the symbols used in the force diagram (400). As shown in FIG. 4, the input surface (402) may be located at an angle ($\theta$) with respect to gravity. In other words, the input surface (402) may be tilted so as to not be parallel with the vector corresponding to the force due to gravity (e.g., to the center of the Earth). The degree of the tilt is the sum of the angle in which the input device is mounted and the grade of the physical environment in which the automobile is located (i.e., angle at which the automobile is positioned in the physical environment), such as angle of uphill or downhill in which the automobile is instantaneously located.

As shown in FIG. 4, at least two environmental forces act on the input surface (402). The first environmental force is the force due to gravity (406). The force due to gravity (406) (i.e., gravitational force) (Fg) is defined is mass (m) multiplied by gravity (g). In equation form, Fg=m*g. A second environmental force acting on an input surface is the force due to the acceleration of the automobile (Fa) (408). The Fa is defined as acceleration (a) multiplied by the mass (m). In equation form, Fa=m*a. The mass m is the mass of the input surface and any display. The gravity g is the gravitational constant (e.g., 9.8 meters/second$^2$). Acceleration a is the movement of the automobile.

As shown in FIG. 4, the gravitational force (406) has a vector toward the center of the earth. However, an input object applying force to the input surface applies the force normal to the input surface (402) (i.e., perpendicular to the plane of the input surface). In other words, the force sensor electrodes measure total force that is normal to the plane of the input surface (402). Thus, to account for the gravitational force (406), only the component of the gravitational force (406) that is normal to the input surface (402) is used. As shown in FIG. 4, the component of the gravitational force (406) that is normal to the input surface is the gravitational force multiplied by the sin($\theta$) (i.e., mg*sin ($\theta$)).

Further, as shown in FIG. 4, the force due to vehicle acceleration (408) as measured by the force sensors has a component parallel to the force sensor sensitivity axis. In the case of the automobile accelerating through a driver pressing an acceleration pedal, the force due to acceleration (408) is toward the front of the automobile. To calculate the component of force due to acceleration (408) that is normal to the input surface, the force due to acceleration is multiplied by the cos($\theta$) (i.e., ma*cos ($\theta$)).

The environmental forces may be determined using the accelerometer. In particular, the accelerometer and the processing system may be calibrated based on a static position with respect to gravity. Thus, the measurement from the accelerometer may provide the change of gravitational force with respect to the calibrated setting for gravity.

Figure 5:
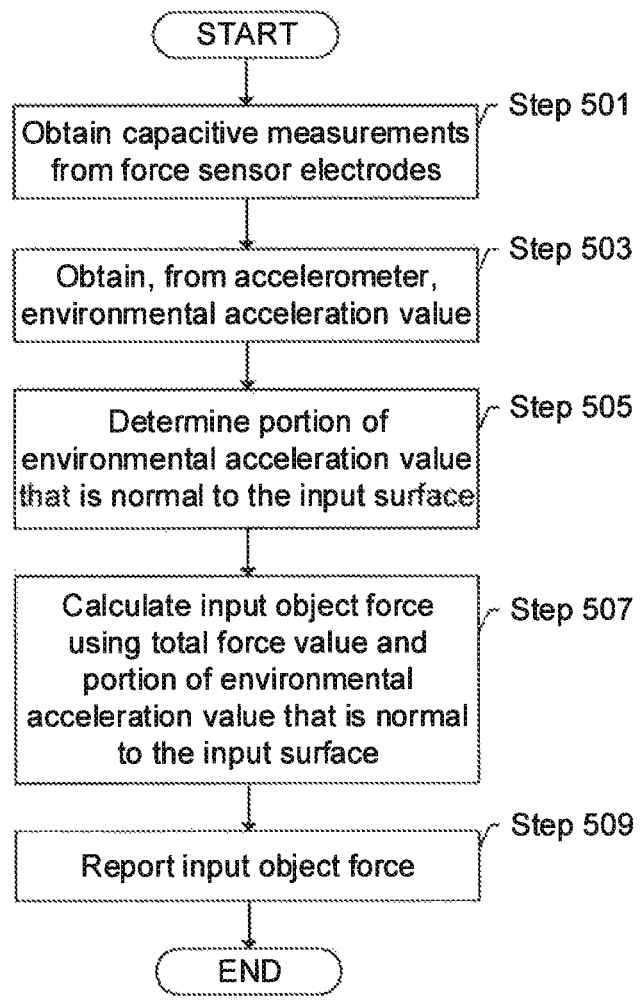
FIG. 5 shows a flowchart in accordance with one or more embodiments of the invention.

FIG. 5 shows an example in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 5 shows a flowchart for determining the force applied by an input object on an input surface in an automobile in accordance with one or more embodiments of the invention. In Step 501, measurements from the force sensors are obtained in accordance with one or more embodiments of the invention. Different techniques maybe used to obtain measurements from the force sensors depending on the type of force sensors.

Measurements may be directly acquired from the various force sensors. For example, when the force sensors are strain gauge based load cell, a measurement may be acquired from each strain gauge based load cell. The measurements may be aggregated to obtain a total force value on the input surface.

Another technique may be based on capacitive sensing technologies. The following is a description of obtaining force measurements using capacitive sensing technologies. A raw image is obtained from absolute and/or mutual capacitive measurements of the sensing region. Absolute capacitance is determined by determining the amount of electric charge added to a force sensor electrode to increase the electric potential of the force sensor electrode by one unit. In one or more embodiments of the invention, the amount of electric potential is affected by the distance to the housing and, subsequently, the compression of the compressible layer as affected by force. To determine the absolute capacitance, the force sensor electrodes are driven with a modulated sensing signal to determine the amount of electric charge. Measurements at each force sensor electrode are obtained. For example, the measurements may be obtained at once or at different times. Mutual capacitance measurements may be obtained by transmitting a transmitter signal with a transmitter electrode (e.g., a force sensor electrode). Resulting signals are received using another force sensor electrode, which is the receiver electrode. In one or more embodiments of the invention, the resulting signals are affected by the distance between the transmitter electrode and receiver electrode and, subsequently, the compression of the compressible layer as affected by force. Regardless of whether mutual capacitive measurements or absolute capacitive measurements are used, the measurements may be combined into a raw image.

Total force value from the measurements is determined. To determine the total force value, positional information of an input object may also be obtained for an input object. In particular, the positional or touch sensor electrodes may operate according to a sensing technology (e.g., absolute or mutual capacitive, or other sensing technology) to obtain positional measurements. The positional measurements may be processed to identify the position of the input object on the input surface. In other words, the position along the axes is determined from the processing.

In at least some embodiments, obtaining the capacitive force measurements may be performed at the same time as obtaining the positional measurements, such as using the same electrodes. Thus, the raw image may include both capacitive force information and positional information. In such a scenario, the raw image may be processed to obtain a force image having only force measurements. Further processing may be performed to account for background noise, and to remove erroneous data.

Weights may be applied to the normalized force measurements according to the bending properties of the input surface (and display). The weights may be pre-determined using calibrated data and independent of positional information, or may depend on position of the input object. Each capacitive force measurement is multiplied by the respective weight to obtain revised capacitive measurements.

Further, from the revised capacitive measurements, a cumulative capacitive sensor response may be determined. The cumulative capacitive sensor response is the accumulated capacitance across the force sensor electrodes. Force information is determined using the cumulative capacitive sensor response. To determine force information, a corrective factor matching the position of the input object on the input surface may be obtained. The cumulative capacitive sensor response may be multiplied by the correction factor to obtain a corrected cumulative capacitive sensor response. The correction factor may be based, for instance, on a table lookup or a formula such as a cubic interpolation between calibrated positions on the input surface. The corrected cumulative capacitive sensor response may be translated into a total force value defining the amount of force of the input object. In other words, the amount of the corrected cumulative capacitive sensor response may be directly correlated to a corresponding total force value. As discussed above, the total force value includes the force of the input object and the component of environmental force that is normal to the display.

In Step 503, from the accelerometer, the environmental acceleration value is obtained. In some embodiments, the processing system synchronizes obtaining the capacitive measurements from the force sensors in Step 501 with obtaining the environmental acceleration value from the accelerometer. For example, the processing system may drive the force sensors at the same frame rate as requesting the environmental acceleration from the accelerometer. Thus, the environmental acceleration measurement is for the same time as the capacitive measurements are obtained. In some embodiments, the obtaining of the environmental acceleration value is not synchronized with the capacitive force measurements. For example, the processing system may obtain the environmental acceleration value from an accelerometer that is not controlled by the processing system. The accelerometer may send the environmental acceleration value on request or at a particular interval.

The environmental acceleration value may be a single value or multiple values. The one or more environmental acceleration values may be measurements that directly or indirectly identify the amount of acceleration and the direction of the acceleration.

From the environmental acceleration value, the component of the environmental acceleration value that is normal to the input surface is determined. In particular, if a single axis accelerometer is used and is positioned to measure the environmental acceleration, then a direct measurement from the single axis accelerometer may be used rather than using $\cos(0)$ as in the example of FIG. 4. If the accelerometer is positioned to be parallel to the automobile and the acceleration is due to the automobile moving forward, the component of the environmental acceleration value normal to the input surface may be as shown in FIG. 4. If a three axis accelerometer is used, the direction of the measured acceleration may be determined directly or indirectly from the output of the three axis accelerometer. In any use of the accelerometer, if the direction of the acceleration is determinable directly or indirectly from the accelerometer (e.g., using the angular location of the accelerometer and the measurements from the accelerometer), then using geometry, the component of the acceleration that is normal to the input surface may be calculated based on the direction of the acceleration.

In Step 507, an input object force is calculated using total force and component of environmental acceleration value that is normal to the input surface. In particular, the component of the environmental acceleration value that is normal to the input surface may be multiplied by a stored value for mass. The stored value of the mass may be stored for the input device in the processing system or in a configuration file of the processing system (e.g., when the input device is initially configured). Thus, the stored value for the mass may be obtained by the processing system and used to obtain a component of the environmental force that is normal to the input surface. The component of the environmental force that is normal to the input surface may be referred to as the environmental force value. The environmental force value may be subtracted from the total force value to obtain the input object force. In other words, the input object force may be the total force value minus the component of the environmental force that is normal to the input surface.

In Step 509, the processing system reports the input object force. In one or more embodiments of the invention, the input object force may be reported to a central processor of the input device, or to a control system of the automobile. The central processor or processing system may use the input object force as user input requesting an action to be performed. For example, the user input may be to select an item in the graphical user interface, open or close an application, provide further information, adjust a control system of the automobile (e.g., setting of the automobile, radio, climate, etc.) or perform another action.

The following example is for explanatory purposes only and not intended to limit the scope of the invention. In the following example, consider the scenario in which the input device is in a truck. FIG. 6.1 shows the truck (600) at rest on a level surface with a display+touch+force sensor with mass 1 kilogram (kg) in the dash tilted back at $-10°$. In particular, the display (not shown) is tilted to allow the driver to view the display when looking slightly down on the dash. FIG. 6.2 shows a diagram (602) of the forces acting on the 1 kg display+touch+force sensor when the truck is in the state of FIG. 6.1. The forces are due to the force of gravity $\vec{g}$ having magnitude 9.80665 meters per second squared (m/s$^2$). The component of gravitational acceleration along the force sensitivity axis (604) is -mg·sin(θ) (606), which is opposed by the force sensors to produce a net zero force on the display+touch+force sensor since the truck and the display is at rest. The force sensors thus measures $F_s$=-mg sin(θ)

Because measurements are in the static untouched state, the measurements correspond to the baseline.

Next, consider the scenario in which the truck is accelerating up an incline. In particular, FIG. 6.3 shows the truck (600) of FIG. 6.1 now accelerating at 2 m/s$^2$ up an incline of 15°. In FIG. 6.3, the incline ω=15° at 2 m/s$^2$. FIG. 6.4 is the force diagram (620), where θ is still the angle between the force sensitivity axis and the direction of vehicle acceleration $\vec{a}$, but now ω+θ is the angle between the display+touch+force sensor and the gravitational vector $\vec{g}$. The force sensors now measure, in the absence of a touching finger, $F_s$=-m{a cos(θ)+g sin(ω+θ)}.

The incline angle ω and the vehicle acceleration $\vec{a}$ are now nonzero and therefore change the value of the force sensor readings in spite of a lack of a touching finger. The additional terms are purely acceleration based, and an additional 3-axis accelerometer located, for example, behind the display measures acceleration components in the example.

Next consider the scenario in which a finger in the truck is touching the display with applied force of Ff. The total force on the force sensors will be $F_s=-m\{a \cos(\theta)+g \sin(\omega+\theta)\}+F_f$. Both the gravitational force component $-mg \sin(\omega+\theta)$ and the vehicle acceleration component $-ma \cos(\theta)$ are measured by the 3-axis accelerometer, but all three are measured by the force sensors. To recover the finger force, the force sensor reading is obtained. From the force sensor reading, the components of the accelerometer reading are subtracted. The values of the example and an applied finger force of 150 gm·force==1.471 N shown in the table below.

| Variable | Value |
|----------|-------|
| m | 1 [kg] |
| Θ | −10 [°] |
| ω | 15 [°] |
| a | 2 [m/s2] |
| Ff | 1.471 [N] |
| g | 9.80665 [m/s2] |

In the example, the force sensors in FIG. 6.1 will read 1.7025 N. After placing the automobile at rest on an incline of 15° the force sensors will read −0.8547 N. Upon accelerating the automobile at 2 m/s², the total force sensor reading will be −2.8243 N. The accelerometer will also read −2.8243 N. After applying the finger force normal to the display+touch+force sensor, the force sensors will read −1.3533 N. To compensate for gravity and vehicle acceleration, the accelerometer reading is subtracted (i.e., −1.3533−−2.8243=1.471 N==150 gm·force). Thus, the force applied by the finger is able to be isolated from the force of the moving vehicle and gravity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for automotive acceleration compensation force sensing, the processing system comprising:
   sensor circuitry configured to:
      drive the plurality of force sensors at a frame rate, and
      obtain, based on driving the plurality of force sensors, a plurality of measurements from a plurality of force sensors utilizing capacitive sensing; and
   processing circuitry coupled to the sensor circuitry and configured to:
      determine a total force value from the plurality of measurements,
      request, at a time set by the frame rate of driving the plurality of force sensors, an environmental acceleration value from an accelerometer,
      obtain, from the accelerometer and based on the request, the environmental acceleration value,
      calculate an input object force value on an input surface using a total force value and the environmental acceleration value, and
      report the input object force value.

2. The processing system of claim 1, wherein calculating the input object force value on the input surface comprises:
   calculating an environmental force value from the environmental acceleration value, and
   subtracting the environmental force value from the total force value.

3. The processing system of claim 2, wherein the processing circuitry is further configured to:
   obtain a weight of an input device having the input surface, and
   multiply the weight by the environmental acceleration value to obtain the environmental force value.

4. The processing system of claim 1, wherein the accelerometer is a three-axis accelerometer.

5. The processing system of claim 4, wherein:
   the plurality of force sensors is located inside an automobile,
   the environmental acceleration value is based, at least in part, on centripetal acceleration that is perpendicular to movement of the automobile, and
   the processing circuitry is further configured to:
      calculate a component of the environmental acceleration value that is normal to the input surface,
      wherein calculating the input object force value on the input surface uses the component of the environmental acceleration value that is normal to the input surface.

6. The processing system of claim 1, wherein the environmental acceleration value is based, at least in part, on a movement of an automobile.

7. The processing system of claim 1, wherein the environmental acceleration value is based, at least in part, on gravity.

8. The processing system of claim 1, wherein the environmental acceleration value is measured normal to the input surface.

9. A method for automotive acceleration compensation force sensing, the method comprising:
   determining a total force value from a plurality of measurements obtained from a plurality of force sensors utilizing capacitive sensing, the plurality of measurements obtained in response to driving the plurality of force sensors at a frame rate;
   requesting, at a time set by the frame rate of driving the plurality of force sensors, an environmental acceleration value from an accelerometer;
   obtaining, from the accelerometer and based on the request, the environmental acceleration value;
   calculating an input object force value on an input surface using a total force value and the environmental acceleration value; and
   reporting the input object force value.

10. The method of claim 9, wherein calculating the input object force value on the input surface comprises:
    calculating an environmental force value from the environmental acceleration value, and
    subtracting the environmental force value from the total force value.

11. The method of claim 10, further comprising:
    obtaining a mass of an input device having the input surface, and
    multiplying the mass by the environmental acceleration value to obtain the environmental force value.

12. The method of claim 9, wherein the accelerometer is a three-axis accelerometer.

13. The method of claim 12, further comprising:
    calculating a component of the environmental acceleration value that is normal to the input surface, wherein calculating the input object force value on the input surface uses the component of the environmental acceleration value that is normal to the input surface, wherein the plurality of force sensors is located inside an automobile, and wherein the environmental acceleration value is based, at least in part, on centripetal acceleration that is perpendicular to movement of the automobile.

14. The method of claim 9, wherein the environmental acceleration value is based, at least in part, on a movement of an automobile.

15. The method of claim 9, wherein the environmental acceleration value is based, at least in part, on gravity.

16. The method of claim 9, wherein the environmental acceleration value is measured normal to the input surface.

17. A system for automotive acceleration compensation force sensing, the system comprising:

an accelerometer configured to measure an environmental acceleration value;

a plurality of force sensors utilizing capacitive sensing; and processing circuitry communicatively coupled to the plurality of force sensors and the accelerometer, the processing circuitry configured to:

determine a total force value from a plurality of measurements obtained from the plurality of force sensors, the plurality of measurements obtained in response to driving the plurality of force sensors at a frame rate, request, at a time set by the frame rate of driving the plurality of force sensors, the environmental acceleration value from the accelerometer, obtain, from the accelerometer and in response to the request, the environmental acceleration value, calculate an input object force value on an input surface using the total force value and the environmental acceleration value, and report the input object force value.

18. The system of claim 17, further comprising:

an input device comprising the plurality of force sensors, the processing circuitry, and the input surface.

19. The system of claim 18, wherein the input device is communicatively coupled to the accelerometer, and wherein the accelerometer is affixed to an automobile comprising the input device.

20. The system of claim 17, wherein the plurality of force sensors is located inside an automobile, the environmental acceleration value is based, at least in part, on centripetal acceleration that is perpendicular to movement of the automobile, and the processing circuitry is further configured to:

calculate a component of the environmental acceleration value that is normal to the input surface, wherein calculating the input object force value on the input surface uses the component of the environmental acceleration value that is normal to the input surface.

* * * * *